(12) United States Patent
Longino (10) Patent No.: US 10,127,588 B2
(45) Date of Patent: Nov. 13, 2018

(54) METHODS AND APPARATUS FOR PROVIDING CUSTOMER ASSISTANCE

(71) Applicant: Jeffrey David Longino, Fayetteville, GA (US)

(72) Inventor: Jeffrey David Longino, Fayetteville, GA (US)

(73) Assignee: NCR Corporation, Atlanta, GA (US)

( * ) Notice: Subject to any disclaimer, the term of this patent is extended or adjusted under 35 U.S.C. 154(b) by 909 days.

(21) Appl. No.: 13/779,964

(22) Filed: Feb. 28, 2013

(65) Prior Publication Data
US 2014/0244437 A1  Aug. 28, 2014

(51) Int. Cl.
*G06Q 30/00*  (2012.01)
*G06Q 30/06*  (2012.01)

(52) U.S. Cl.
CPC ..... *G06Q 30/0613* (2013.01); *G06Q 30/0639* (2013.01); *G06Q 30/0641* (2013.01)

(58) Field of Classification Search
CPC .... G06Q 30/06–30/0645; G06Q 30/08; G06Q 50/01
See application file for complete search history.

(56) References Cited

U.S. PATENT DOCUMENTS

| 7,091,829 | B2 * | 8/2006 | Lee | G08B 13/19647 340/286.02 |
| 2007/0136140 | A1 * | 6/2007 | Smith, Jr. | G06Q 30/06 705/80 |
| 2011/0055046 | A1 * | 3/2011 | Bowen | G06Q 10/08 705/26.41 |
| 2013/0006789 | A1 * | 1/2013 | Fulkerson | G06Q 10/00 705/26.1 |
| 2014/0019279 | A1 * | 1/2014 | Argue | G06Q 30/00 705/26.1 |
| 2014/0040043 | A1 * | 2/2014 | Barron | G06Q 10/00 705/14.66 |
| 2014/0081803 | A1 * | 3/2014 | Clawson | G06Q 30/0261 705/26.9 |
| 2014/0222618 | A1 * | 8/2014 | Stamp | G06Q 30/0611 705/26.35 |

OTHER PUBLICATIONS

T. D. Lowen, P. T. O'Hare and G. M. P. O'Hare, "The WAY ahead: entity rendezvous through mobile agents," 37th Annual Hawaii International Conference on System Sciences, Jan. 5-8, 2004. 8 pp. (Year: 2004).*

* cited by examiner

*Primary Examiner* — Adam L Levine
(74) *Attorney, Agent, or Firm* — Schwegman, Lundberg & Woessner (57) ABSTRACT

Techniques for providing customer assistance with real-time feedback are presented herein. A request for customer assistance is generated by a customer using an application executing on a handheld mobile smart device. The request is transmitted to an employee using another handheld mobile smart device. The request is accepted by the employee and a response is transmitted back to the customer. The response includes the employee's expected arrival time at the customer's location and a floor plan map that depicts the progress of the employee as the employee travels to the customer's location.

18 Claims, 7 Drawing Sheets

METHODS AND APPARATUS FOR PROVIDING CUSTOMER ASSISTANCE

FIELD OF THE INVENTION

The present invention relates to improved systems and methods employing mobile devices and more specifically to such systems and methods in which handheld mobile devices are used by customers to request assistance from store personnel where the customers are shopping and to track the responses of store personnel to provide customer feedback.

BACKGROUND

The floor space of some retail establishments has grown over the years to the point where it is common to have stores with between 50,000 and 120,000 square feet of floor space. These large retail stores, sometimes called big box stores, include home improvement centers, large department stores and electronic centers. Some of these stores have over 100,000 unique items for sale and this factor along with the large size of the stores will tend to increase the level of frustration a customer experiences as they try to find items they wish to purchase. An increase in the level of customer frustration will lower certain customer metrics such as the average amount purchased per customer visit and the customer satisfaction level. A decrease in these metrics will negatively impact the financial metrics for the retail establishment.

Some items within big box stores can be selected by a customer and transported to a checkout terminal for purchase without the need for assistance from store personnel. Other items require assistance from store personnel before they can be purchased. For example, home improvement centers sell certain types of wire by the foot where a large length of the wire is wound around a spool. Before the wire can be purchased, an employee of the store must be called to remove the desired amount of wire from the spool. In some big box stores, a customer call button is located near the spool of wire and a customer wishing to purchase an amount of wire must first press the button and then wait for an employee to arrive and remove the desired amount of wire. However, this type of system is problematic because employees sometimes do not receive the request generated when the button is pressed or they are busy and cannot respond in a short period of time. The customer has no way of knowing if anybody will be coming to assist them and at some point in time will simply give up waiting and leave. Additionally, call systems of this type have no reliable way for store personnel or store managers to monitor requests for assistance to determine whether the requests are being properly handled and to intervene if necessary to assist the customer.

In addition, the shear volume of items for sale in a big box store makes finding an item difficult and time consuming. A customer may have no idea where an item is located or they may find an item similar to what they need but fail to find the specific item they need. It may be the item is not carried by the store or is located in a different location. In these and other cases, customers will need assistance from store personnel and in some cases the assistance can only be supplied by personnel with specific training or knowledge of the item being sought. In these cases, the customer must stop looking for the item and start looking for a person that can assist them with the search for the item. This process is frustrating for the customer and again lowers customer satisfaction with the shopping experience.

SUMMARY

Among its several aspects, the present invention seeks to overcome or ameliorate at least one of the disadvantages of the prior art, or to provide a useful alternative.

Therefore, among its several aspects, the present invention recognizes it would be desirable to provide a solution that provides assistance to customers that need help with an item or have a question without lowering customer satisfaction and the shopping experience for the customer.

Among its several aspects, the present invention recognizes there are advantages to allowing a person to use a personal mobile smart device executing a downloaded software application to request assistance and ask questions of store personnel. Advantages of the invention include displaying a floor plan map of the store on the smart device that indicates and updates the location of the person and store personnel that can provide assistance. In addition to the floor plan map, the software application provides the person with the expected arrival time for store personnel after a request for assistance has been made by the person. The floor plan map also provides an indication of the location of general types of items, such as, plumbing related items, electrical related items, or the like.

Among its several aspects, the present invention further recognizes there is an advantage to allowing the person to use the downloaded software application executing on their personal mobile smart device to send messages to store personnel requesting information or help and to receive responses from store personnel without having to know the identity of the store personnel.

Among its several aspects, the present invention recognizes there are advantages to allowing a person to use a personal mobile smart device executing a downloaded software application provided by an establishment, such as a library or a museum, where the person is currently located to request assistance and ask questions of employees or staff. Advantages of the invention include displaying a floor plan map of the establishment on the smart device that indicates and updates the location of the person and the employees/staff that can provide assistance. In addition to the floor plan map, the software application provides the person with expected arrival time for an employee/staff/person after a request for assistance has been made by the user. The floor plan map also provides an indication of the location of general types of items, for example in a library the location of the fiction and non-fiction book sections, periodicals, music and the like.

Among its several aspects, the present invention recognizes there are advantages to allowing employees of store to receive requests for assistance from persons shopping in a store. The employee uses an employee mobile smart device that is executing a downloaded software application designed for use by the employee to communicate with the software application executing on the customer's personal mobile smart device. When a customer using their mobile smart device requests assistance, the request is transmitted to the employee mobile smart device of each employee on duty. The software application executing on each employee mobile smart device displays a floor plan map of the store showing the current location of the person making the request and all the employees that are currently on duty and able to service the request. This allows the employee closest to the person to service the request and if needed travel to the location of the person. When an employee accepts responsibility for servicing the request, a message is sent to the other employee mobile smart devices indicating which employee has accepted the request. Each of the employee mobile smart devices then updates the displayed floor plan map to indicate which employee has accepted the request for assistance and showing that employee as currently engaged or busy servicing the customer's request. If after a predetermined period of time no employee has accepted responsibility for the request for assistance, a notification is sent to a store manager so the manager can take action.

In accordance with an embodiment of the present invention, there is provided a method implemented utilizing a mobile smart device for a user in an establishment to request assistance from assistants operating the establishment, the method comprising: receiving a request for assistance from the user within the establishment; determining a current location for the mobile smart device within the establishment; transmitting a request including information about the request for assistance and the current location; receiving, in response to the transmitted request, data that includes an answer to the request for assistance; and displaying the received data to the user of the mobile smart device.

A more complete understanding of the present invention, as well as further features and advantages of the invention, will be apparent from the following Detailed Description and the accompanying Drawings.

BRIEF DESCRIPTION OF THE DRAWINGS

The present invention may take form in various components and arrangement of components and in various methods. The drawings are only for purposes of illustrating example embodiments and alternatives and are not to be construed as limiting the invention. The drawings are not necessarily drawn to scale. Throughout the drawings, like element numbers are used to describe the same parts throughout the various drawings, figures and charts.

DETAILED DESCRIPTION

In the following description, numerous details are set forth to provide an understanding of the claimed invention. However, it will be understood by those skilled in the art that aspects of the claimed invention may be practiced without utilizing all of these details and that numerous variations or modifications from the described embodiments are possible and envisioned.

Figure 1:
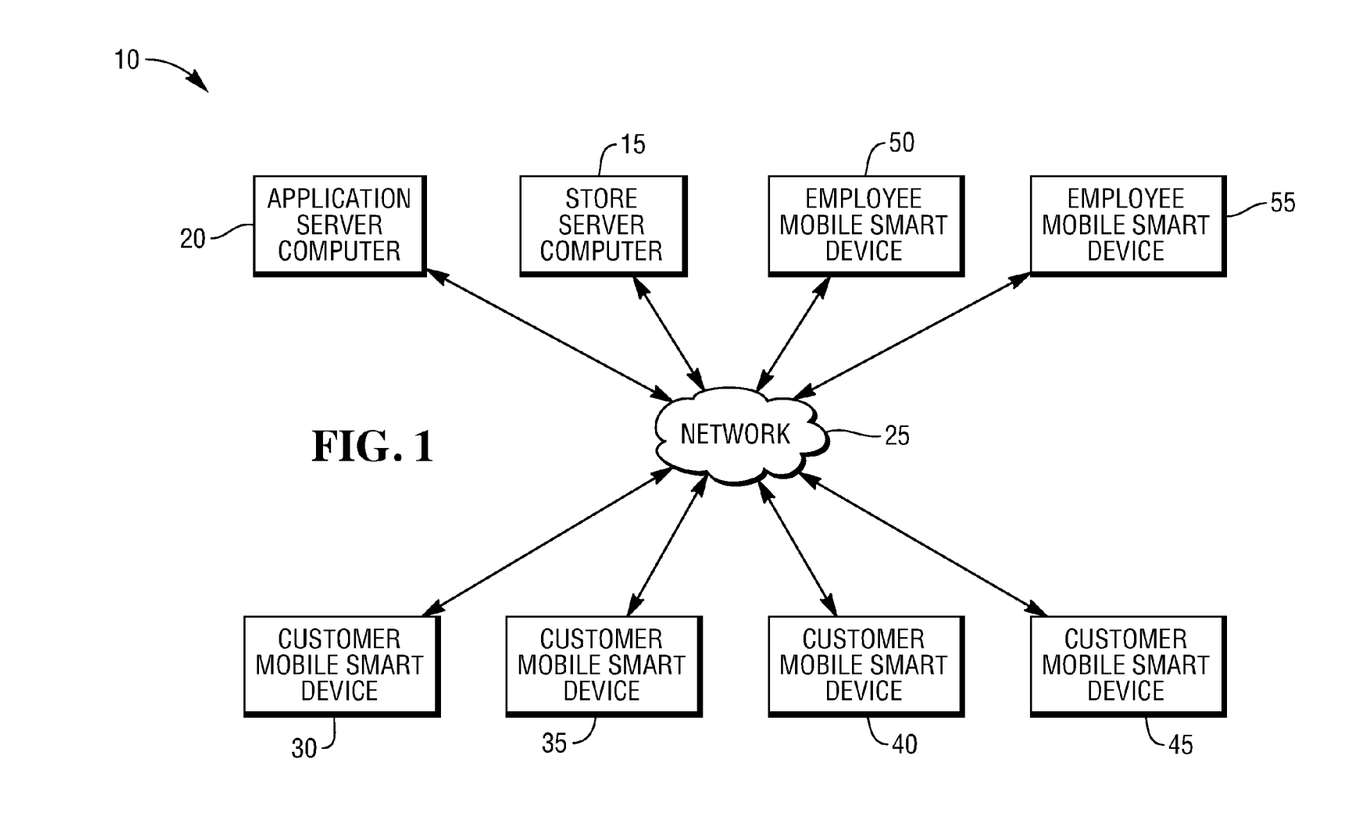
FIG. 1 is a high-level block diagram illustrating an embodiment of a customer assistance system.
Figure 3:
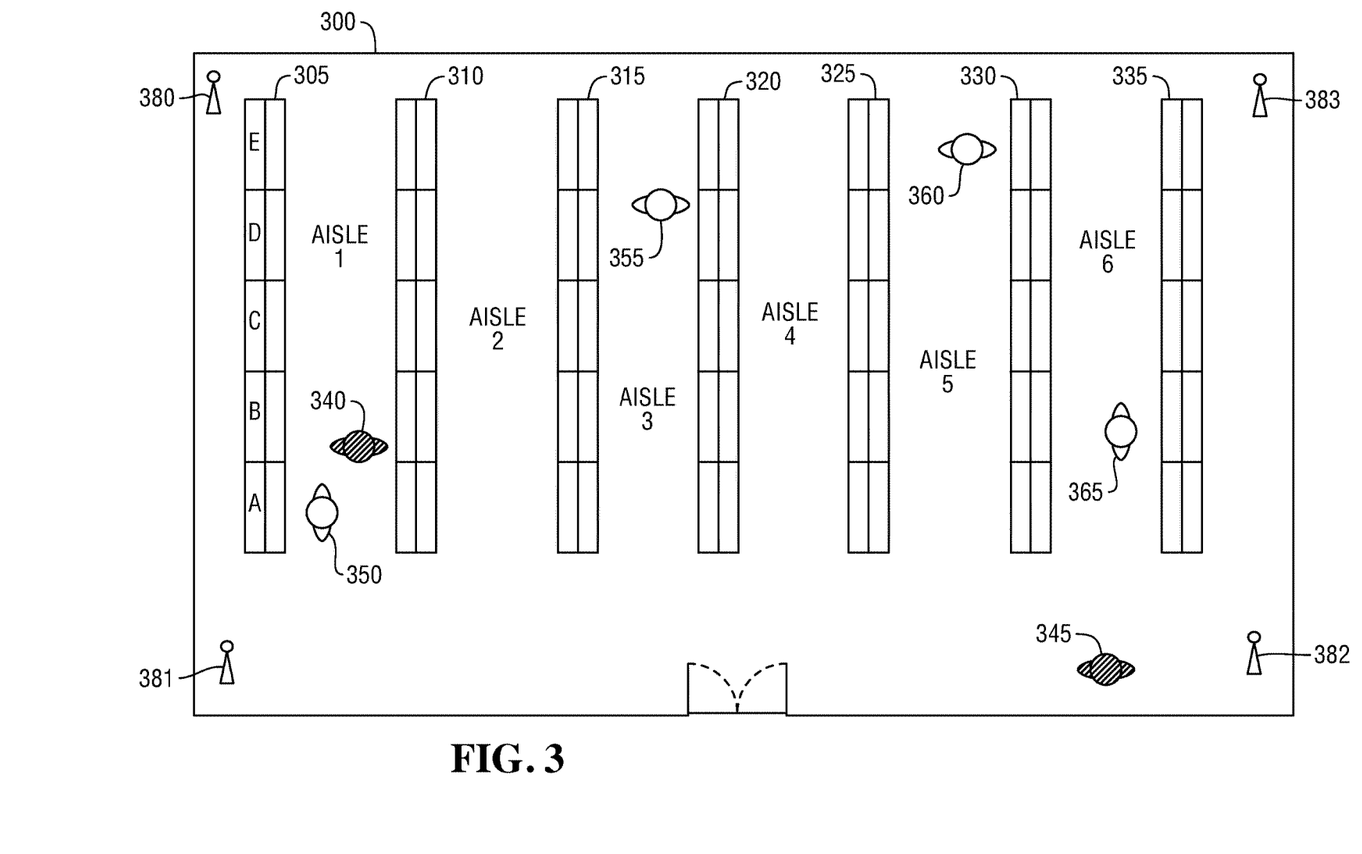
FIG. 3 is an example floor plan map of a store.

With reference to FIG. 1, there is provided a high-level block diagram of a customer assistance system 10. The customer assistance system 10 of this embodiment includes a store server computer 15, an application server computer 20, four customer mobile smart devices 30, 35, 40, 45 and two employee mobile smart devices 50, 55. The two server computers 10, 15 and the mobile smart devices 30, 35, 40, 45, 50, 55 communicate over a network 25. The network 25 may suitably include a network which uses a communications protocol based on transmission control protocol/internet protocol (TCP/IP). The network 25 may suitably include a combination of local area and wide area networks. The network 25 may further suitably include any combination of wireless and wired networks. The wireless networks include local area wireless computer networks and cellular based data networks. The network 25 may suitably include a combination of private and public networks, including a global communication network, such as the Internet. The term cloud based servers is sometimes used and refers to remote computer servers accessed over a public network, such as the Internet. The network 25 includes a local area WIFI network that is implemented within a store 300 (FIG. 3). The store server computer 15 and application server computer 20 communicate with mobile smart devices located within the store 300 using either the local area WIFI network or a cellular wireless network that provides a connection to the Internet, both of which are included as part of the network 25.

The store server computer 15 includes a processor that executes application software which causes the processor to perform features and functions that support the operations of the store. Store personnel and customers of the store 300 are given access to certain of the features and functions based upon their job function or roll. A roll defines the type work or activity a person performs. Examples of rolls are cashier, customer assistant, office manager, store manager and customer, to name just a few. The application software provides features and functions that may suitably include point-of-sale operations, sales and inventory management, personnel management and customer assistance services.

The application server computer 20 maintains multiple software applications designed to execute on mobile smart devices 30, 35, 40, 45, 50, 55. These applications include a customer assistance application 216 (FIG. 2A) designed to be used by a customer of the store 300 to request assistance and an employee customer assistance application 217 (FIG. 2B) designed to be used by employees of the store 300 to provide assistance to customers using the customer assistance application 216. The application server computer 20 uses the network 25 to transmit the customer assistance application 216 to the customer mobile smart devices 30, 35, 40, 45 and to transmit the employee customer assistance application 217 to the employee mobile smart devices 50, 55. Employees may suitably be required to properly identify themselves to the application server computer 20 before the application server computer 20 will transmit the employee customer assistance application 217. In addition, employees have to login to the store server computer 15 every time they use the application. Customers do not have to provide identification prior to the application server computer 20 transmitting the customer assistance application 216. However, in some embodiments, the application server computer 20 requires the customer to provide a valid email address that can be used for communicating with the customer including instructions and marketing information. In some embodiments, a valid email address is required to be entered during a registration process that executes the first time the customer executes the downloaded customer assistance application. Additional details regarding the downloading the applications are provided below.

Figure 2A:
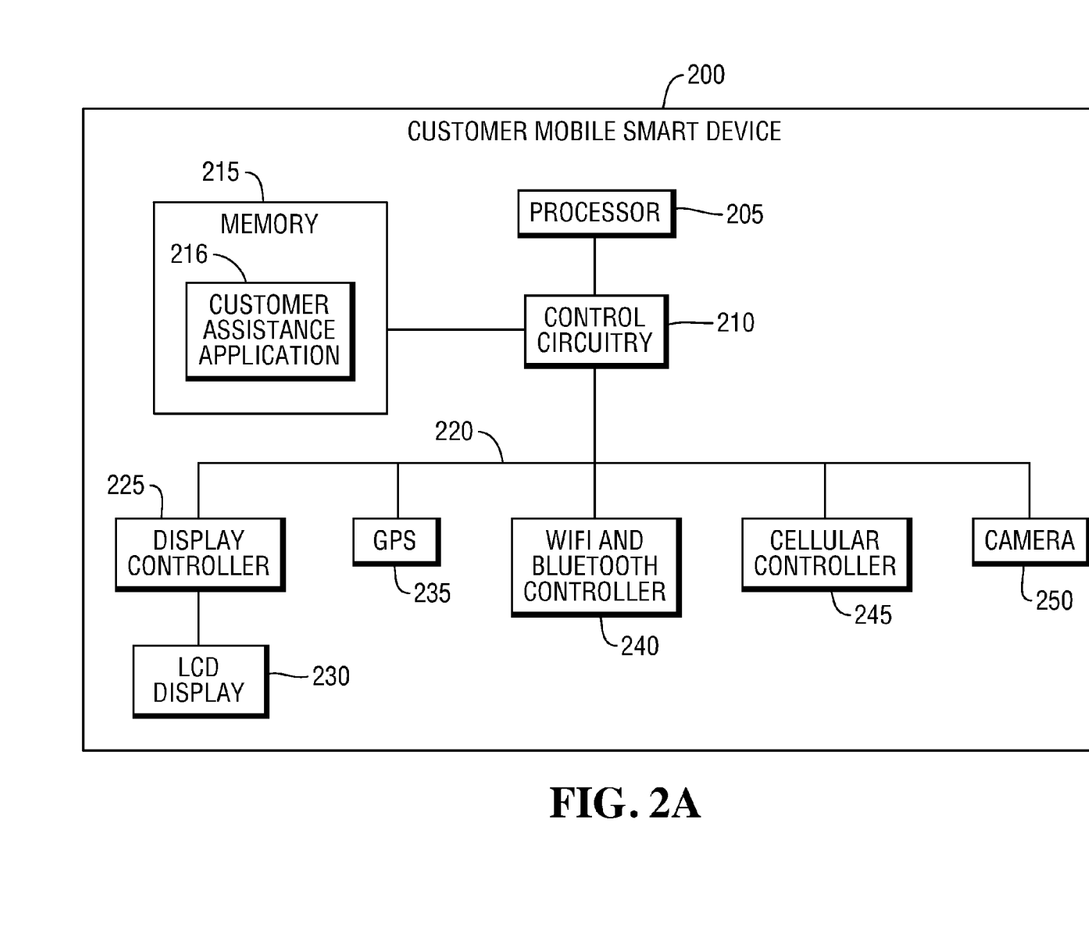
FIG. 2A is a high-level block diagram illustrating selected hardware and software components of a customer mobile smart device.

Turning to FIG. 2A, there is provided a high-level block diagram of hardware and software components of an embodiment of a personal mobile smart device (PMSD) 200 which may suitably be used as the customer mobile smart devices 30, 35, 40, 45 depicted in FIG. 1. The PMSD 200 includes a processor 205, control circuitry 210, a memory 215, a computer bus 220, a display controller 225, a Global Positioning System (GPS) 235, a WIFI and Bluetooth communications controller 240, a cellular communications controller 245 and a camera 250. The PMSD 200 may suitably be a smart cell phone, a portable tablet computer or other portable computing device that can download and execute applications. The PMSD 200 is preferably owned by the person operating it or alternatively, may be supplied by the store to the customer.

The display controller 225 is connected to and controls an LCD display 230. The LCD display 230 includes a touch screen device that provides information identifying the location of one or more touches to the surface of the LCD display 230. The processor 205 receives this information and takes actions based on it. The GPS 235 is used to track the location of the PMSD 200 using the GPS satellites that are part of the GPS system. Location information from the GPS is available to the processor 205 and is used by applications executed by the processor 205. The WIFI and Bluetooth communications controller 240 includes the hardware and software required to transmit and receive data over these two types of wireless local area networks. The cellular communications controller 245 includes the hardware and software required to transmit and receive at least computer data over a cellular network. In some embodiments, the cellular communications controller 245 can transmit and receive voice data over the cellular network. The camera 250 captures still images of items within the field of view of the camera 250. The processor 205 may suitably read and process the captured images. The control circuitry 210 provides an interface between the processor 205 and the memory 215 and the processor 205 the devices and components attached to the computer bus 220.

The memory 215 uses non-transitory storage devices including both volatile and non-volatile memory. Non-volatile memory retains stored information even after power is removed from the memory. The non-volatile memory may suitably include flash memory or other types of solid state electronic memory. Computer instructions stored in the memory 215 are executed by the processor 205 which causes the processor 205 to control the components, devices and peripherals that are part of or attached to the PMSD 200 and to implement the features and functions of the PMSD 200. The computer instructions include the customer assistance application 216 which displays information on the LCD display 230 to guide a user through the process of requesting customer assistance from personnel of the store 300. The customer assistance application 216 interfaces with the GPS 235 and/or the camera 250 to determine the location of the PMSD 200 and the WIFI and Bluetooth communications controller 240 or the cellular communications controller 240 to communicate with the store server computer 15 and the application server computer 20.

A customer may suitably download the customer assistance application 216 onto their PMSD 200 using any of a number of different methods. In one method, the customer uses a web browser application executing on the PMSD 200 to navigate to the home page web site for the store 300. On the home page, there is a universal resource locator (URL) that when selected causes the customer assistance application 216 to be downloaded to the PMSD 200. The URL points to a web page that is serviced by the application server computer 20 which communicates over the network 25 with the web browser application to download the customer assistance application 216 into the PMSD 200 for execution by the PMSD 200 on request from the customer.

In another method of downloading the application, the customer captures an image of an optical code using software executing on the PMSD 200. The optical code may suitably include a quick response (QR) code. The optical code may be located within the store 300 or on a web site or printed on an advertisement for the store 300. The software executing on the PMSD 200 decodes the optical code to recover instructions on how to download the customer assistance application 216. The software then communicates with the application server computer 20 over the network 25 and downloads the customer assistance application 216 into the PMSD 200 for execution. Most embodiments require the customer to register their version of the customer assistance application 216 and to provide a valid email address or a customer loyalty number or some other identification before the customer assistance application 216 can be used. The registration process is included as part of the customer assistance application 216 and is executed prior to any other assistance related functions. One benefit of identifying the customer in this way is that customer help requests may be linked with an average dollar amount spent by the customer on his or her last few visits or the like. If the registration process is not completed by the user, the other assistance related functions will not be performed. The information from the registration process is used by the store 300 to identify and communicate with the customer.

Figure 2B:
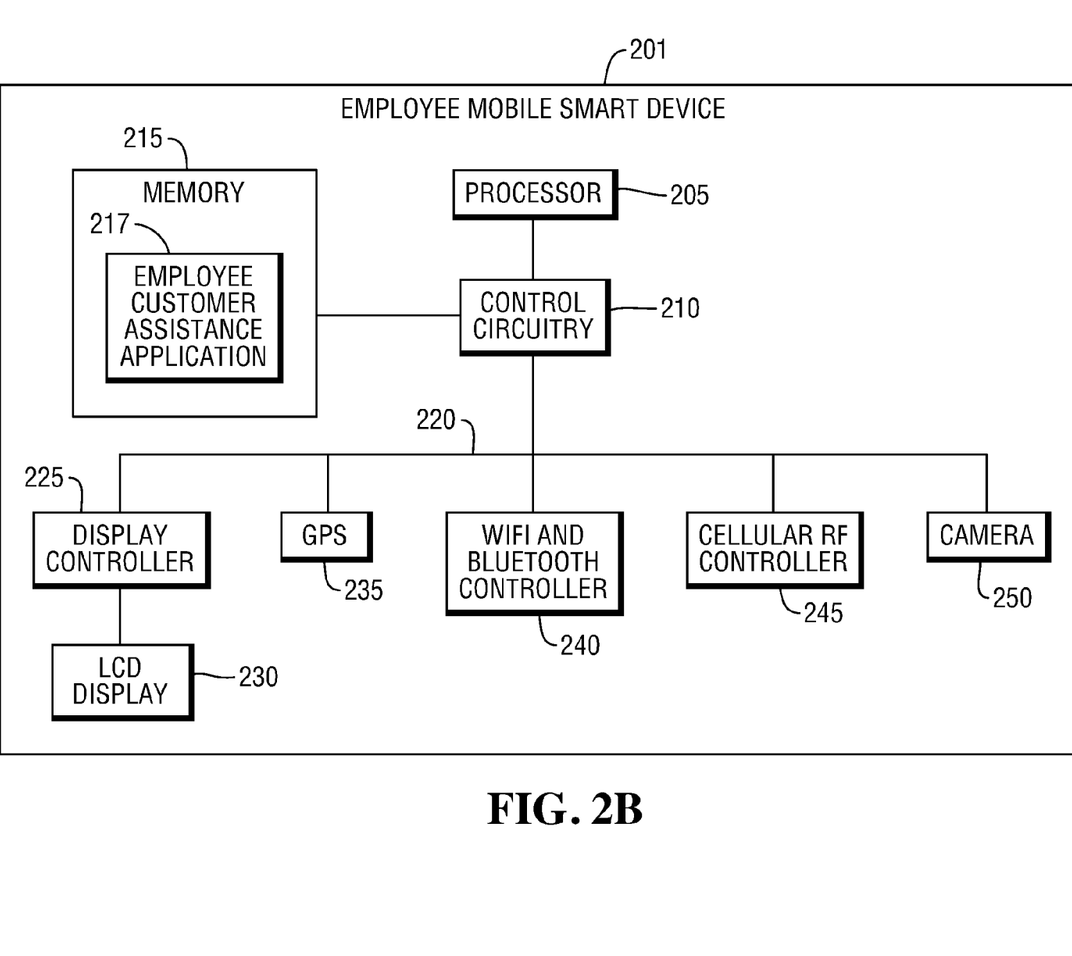
FIG. 2B is a high-level block diagram illustrating selected hardware and software components of an employee mobile smart device.

Turning now to FIG. 2B, there is provided a high-level block diagram of the components of an employee mobile smart device 201 that may suitably be used as one of the employee mobile smart devices 50, 55 depicted in FIG. 1. The main difference between the PMSD 200 and the employee mobile smart device 201 is the software application stored in the memory 215. The software application is the employee customer assistance application 217. This application receives information from the customer assistance application 216 that executes in one of the customer mobile smart devices 30, 35, 40, 45. The employee mobile smart device 201 may suitably include other software for example other employee or store related applications that interface with software executing on the store server computer 15 and provide store related features or functions to the employee.

The employee mobile smart device 201 may suitably be a smart cell phone, a portable tablet computer or other portable computing device that can download and execute applications. The employee mobile smart device 201 may suitably be owned by the store 300 and provided to an employee or it may be owned by the employee and used at work. If the employee mobile smart device 201 is owned by the employee, the customer assistance system 10 has safeguards to terminate employee access to store resources if the employee is terminated.

FIG. 3 illustrates one example embodiment of the floor plan map of the store 300. In this embodiment, the store 300 has seven rows of shelving 305, 310, 315, 320, 325, 330, 335. Each of the rows of shelving 305, 310, 315, 320, 325, 330, 335 is divided into sections labeled A-E, as depicted for the first row 305. Between the rows of shelving 305, 310, 315, 320, 325, 330, 335 are six aisles labeled 1-6. In other embodiments, the store 300 has a different number of the rows of shelving and row sections. Two employees 340, 345 and four customers 350, 355, 360, 365 are depicted at different locations within the store 300. Each of the four customers 350, 355, 360, 365 carries one the customer mobile smart devices 30, 35, 40, 45. As depicted in FIG. 2A, each of the customer mobile smart devices 30, 35, 40, 45 include a copy of the customer assistance application 216 that is executed by the processor 205. Each of the two employees 340, 345 carries one of the employee mobile smart devices 50, 55. As depicted in FIG. 2B, each of the employee mobile smart devices 50, 55 include a copy of the employee assistance application 217 that is executed by the processor 205.

Implemented within the store 300 is a WIFI local area network that is part of the network 25. The WIFI network is implemented using four access points 380, 381, 382, 383 that provide coverage across the store 300. In other embodiments, additional access points are needed to provide full communication coverage. In still other embodiments, only three access points are needed for communication coverage but three is the minimum number of access points that can be used when the WIFI local area number is used to locate mobile smart devices within the store 300. Since GPS signals do not easily propagate through the walls and structures of some building, an alternate method of identifying the location of a mobile smart device within the store 300 may be required. The alternate method uses the access points 380, 381, 382, 383 to triangulate the location of mobile smart devices as they communicate with the access points 380, 381, 382, 383. The access points 380, 381, 382, 383 determine the received signal strengths of a transmission from any mobile smart device to determine the location of the mobile smart device within the store 300. This location information may suitably be transmitted back to the mobile smart device, to the store server computer 15 and made available to one or more of the employee mobile smart devices 50, 55 if the mobile smart device was a customer mobile smart device 380, 381, 382, 383.

Figure 4:
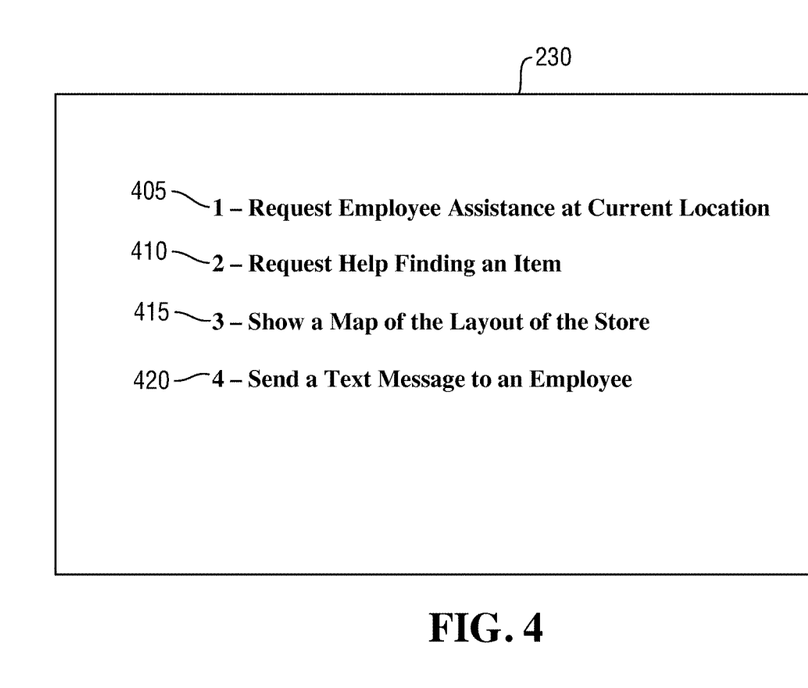
FIG. 4 is an illustration of an example screen displayed on a customer mobile smart device.

FIG. 4 is an illustration of an example display screen generated by the customer assistance application executing on a PMSD 200. In this example, the customer assistance application 216 displays a number of options representing the types of assistance the customer may select. The customer selects an option by touching the display 230 at the location of desired option. The first option 405 allows the customer to request that an employee travel to the current location of the customer to provide assistance. The second option 410 allows the customer to request help finding an item. This option also requests that an employee travel to the current location of the customer. The third option 415 lets the customer request the display of a map that shows the general layout of the store. When the map is received, it is displayed on the display 230. The fourth option 420 allows the customer to send a text message to store employees requesting help or information. All active on duty employees may receive the text message, but generally only one employee will send a response back to the customer. These are examples and are not intended to limit the options to just these options.

When the customer selects the first option 405, the customer assistance application 216 generates an employee request data packet. The request data packet includes the type of request for help and the current location of the PMSD 200 the customer is using. The location may suitably be provided by the GPS 235 or in some embodiments, bar codes placed at predetermined locations on each aisle are scanned to determine a current location. The bar codes are placed at predetermined locations and the location is encoded into the bar code. If these methods are not available, the customer assistance application 216, using the WIFI and Bluetooth communications controller 240, will ping the WIFI network of the store 300 and request location information. The WIFI network of the store 300 will then triangulate the location of the PMSD 200 and return a current location for the PMSD 200. The PMSD 200 then transmits the request data packet over the network 25 to the store server computer 15. The store server computer 15 maintains a list of store employees currently able to respond to customer requests for assistance. Employees are entered on the active list when they login after starting the employee customer assistance application 217. The store server computer 15 may send a copy of the customer's request for assistance to all available store employees or simply send a copy to the available store employee with the shortest queue of customer request or to the store employee closest to the customer.

Each copy of the customer request for assistance is sent to the employee customer assistance application 217 executing on the employee mobile smart device 201 of an available store employee. An available store employee is an employee currently working at the store 300, trained to work with customers and not on break or performing work that would not let them respond to the customer, for example, an employee operating a point-of-sale terminal. After receiving the customer request for assistance, the employee customer assistance application 217 displays a floor plan map of the store 300 and the current location of the customer requesting assistances and the location of all available employees. The location of the customer also provides information about the products in the area, for example the plumbing aisle or electrical aisle. The closest available employee with training or experience in the products in the area may be identified by the system as the one who should accept responsibility for servicing the customer's request for assistance.

Accepting the responsibility for the request for assistance causes the employee customer assistance application 217 to send an acknowledgement to the store server computer 15 which updates the status of the request and sends updated information to all of the other available employees. The updated information is received by the employee customer assistance application 217 executing on the employee mobile smart device 201. Each employee customer assistance application 217 then updates the displayed floor plan map showing which employee has accepted responsibility for the request and the current location of the customer and employees. The other available employees now know the request will be serviced and they can continue their other activities.

After employee customer assistance application 217 for the employee that accepted responsibility for the request sends the acknowledgement, it identifies the type of assistance that was requested. The first assistance option 405 requires the employee to travel to the customer's location so the application 217 calculates the time it will take the employee to travel to the customer's location and to send this data back to the customer. The data includes information that identifies the employee and the time it will take for the employee to arrive at the customer's location. Before the data is sent back to the customer, the employee has an opportunity to add additional time in addition to the calculated travel time. This may be necessary if the employee has to complete a task prior to traveling to the customer or will otherwise be delayed.

When the store server computer 15 receives any type of customer request for assistance, it starts a timer that runs until an acknowledgement is received from an employee signaling they have accepted responsibility for the request. If the timer reaches a predetermined value and no acknowledgement has been received, the store server computer 15 sends a notification to a designated store manager. The store manager may suitably assign an employee to service the request or determine another action to take.

The customer assistance application 217 receives the information from the employee customer assistance application 217 and starts a timer that is displayed on the PMSD 200 that shows the time remaining until the employee will arrive at the customer's location. The employee customer assistance application 217 displays the same arrive time on the employee mobile smart device 201 so the employee knows how long they have to travel to the customer. In some embodiments, the customer assistance application will display a floor plan map of the store 300 and show the current location of the employee. This information is provided by the store server computer 15 as it continuously receives location information from all employee mobile smart devices 201. This tracking features provides valuable feed back to the customer.

The customer may decide to continue shopping if the employee will not arrive for several minutes to assist the customer. Since the current location of the employee is periodically updated on the display 230, the customer can monitor the progress of the employee while they continue to shop and can arrive back at their original location in time to meet the employee or they may decide to meet the employee at an intermediate location along the employee's path.

When the employee arrives at the customer's location, the store server computer 15 determines how long it took for the employee to arrive and keeps statistics for quality control. The store server computer 15 also shows the employee is busy while they are en route to the customer and while they assist the customer after arrival. When other customer requests are received, this employee will be shown as available, but temporary busy. They may still be the best person to handle the request even though the wait time for the customer could be longer than for another employee that is available but not trained in the area of assistance required by the customer.

When the customer selects the second option 410, the customer assistance application 216 generates request for help finding an item. The customer may suitably input the name of the item they wish to find or the customer assistance application 216 will generate additional screens with menus for the customer to select the item from. Once the item is selected or identified, the customer assistance application 216 generates an item request that is transmitted to the store server computer 15 which in some cases will be able to identify the requested item, lookup the location of the item in a product database and return both a location and directions to the customer. If the item cannot be identified by the store server computer 15, the item request is transmitted to all available employees using the process described above for the first option 405. An employee can then accept the item request and enter information to help the customer find the item. This information is then returned back to the customer. In some cases, the employee will need to travel to the customer to get additional information or provide additional help. In this case, the customer will be sent an arrival time for the employee and the floor plan map showing the progress of the employee.

When the customer selects the third option 415, the customer assistance application 216 generates a request for a current store 300 floor plan map. The request is sent to the store server computer 15 which responds by sending a current floor plan map showing the location of major items in the store 300. For example, the major items at a home improvement center may include plumbing items, mill work items, roofing items and plaint to name just a few items. The customer assistance application 216 receives the map and displays it to the customer. The customer can then identify areas they wish to shop and the best way to get there.

When the customer selects the fourth option 420, the customer assistance application 216 displays a screen that allows the customer to enter a text message that will be sent to employees. The customer may use the message to describe an item or service they are searching for or describe a problem and request a solution. The request is sent to the store server computer 15 which then sends the request to all available store employees as described above for the first option 405. An employee will accept the request and either provide an answer in text form that is sent back to the customer or the employee will travel to the customer if necessary. As described above, the arrival time and the floor plan map is sent back to the customer.

In addition to the above described types of customer requests for assistance, other types of request are envisioned such as a request to check a price where the customer scans a bar code on an item sends it to the store server computer 15 for a price check.

Figure 5:
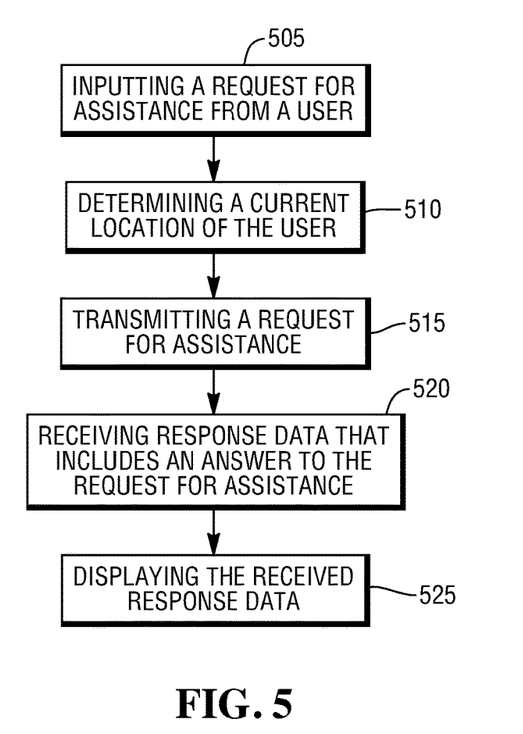
FIG. 5 a high-level flow diagram illustrating a method of operating a customer's personal mobile smart device.

Turning now to FIG. 5, there is provided a flow diagram illustrating a method of operating the PMSD 200. In this method, a user makes a request for assistance using the PMSD 200 executing the customer assistance application 216. The user is located within an establishment. In this embodiment, the user is a customer and the establishment is a retail store. In other embodiments, the user is a patron and the establishment is a library or a gallery such as an art gallery. The customer assistance application 216 has displayed a number of options for assistance to the user.

In step 505, the customer assistance application 216 inputs a selected request for assistance from a user of the PMSD 200. The customer assistance application 216 displays a list of options for different types of assistance that can be provided and asks the user to select the type of assistance they need. An example of some of the possible options for assistance is shown in FIG. 4.

In step 510, the customer assistance application 216 determines the current location of the PMSD 200. The customer assistance application 216 will first poll the GPS device 235 to determine if the GPS device 235 has valid current location information. If the GPS device 235 has valid current location information, the information is used for the current location of the PMSD 200. The information is considered valid, if the GPS device 235 is in communication with a sufficient number of GPS satellites to establish at least a two dimensional location and has successfully calculated a current position within a recent predetermined period of time. The recent predetermined period of time is typically set to 5 seconds or less. The shorter the time period the higher the probability that the customer is still at or close to the calculated location.

In some embodiments, if no position information is available from the GPS device 235, the customer assistance application 216 will send a position request to the local wireless WIFI network in the store 300 which is part of the network 25. The WIFI network will capture signal strength data from each of the wireless access points that receive the RF signal used to request the position. The WIFI network knows the physical location of each of the wireless access points within the store 300 and uses the location and signal strength information from each wireless access point to calculate the current location of the WIFI and Bluetooth communications controller 240 in the PMSD 200. The WIFI network then transmits the location information back to the customer assistance application 216 in response to the position request. The location information is also sent to the store server computer 15.

In some embodiments, the establishment has placed optical codes at predetermined locations on each aisle in the establishment. Each optical code is encoded with information that identifies the location of the optical code. The user captures an image of the nearest optical code and the customer assistance application 216 decodes the optical code to read the location information. This information is then used at the location of the PMSD 200.

In step 515, the customer assistance application 216 transmits the request for assistance on the local WIFI network 25 to the store server computer 15. The store server computer 15 receives the request for assistance and transmits it to all of the employee mobile smart devices 201 that are executing the employee customer assistance application 217. A response will be generated by one of the employee customer assistance applications 217 which is transmitted to the store server computer 15 and then retransmitted to the customer assistance application 216 that transmitted the request. This process is described in more detail above for FIG. 4. The store server computer 15 manages the overall process and keeps statistics on the process. In some embodiments, the customer and employee mobile smart devices bypass the store server computer 15 and communicate directly with each other.

In step 520, the customer assistance application 216 receives response data to the transmitted request for assistance. The response data includes an answer to the request for assistance. The answer depends on which type of request for assistance was selected. For an in person assistance request, the answer includes an estimated arrival time for when the assistant will arrive at the user's location along with a floor plan map of the establishment that shows the location of the user and assistant. For a request for help finding an item, the answer includes a floor plan map of the establishment with the location of the item clearly marked with directions to the item from the user's current location. For a request for a map of the layout of the store, the answer includes a floor plan map of the establishment with major areas identified on the map. For a text message request, the answer is a text message with the answer to the user's question from an assistant.

In step 525, the received response is displayed on the display 230 for the user to see and read. In some cases, the response includes an expected arrival time for employee at the customer's location. The arrival time may suitably be expressed as a fixed time for example 12:23 PM or may be expressed as a count down timer showing the time remaining until the employee arrives.

Figure 6:
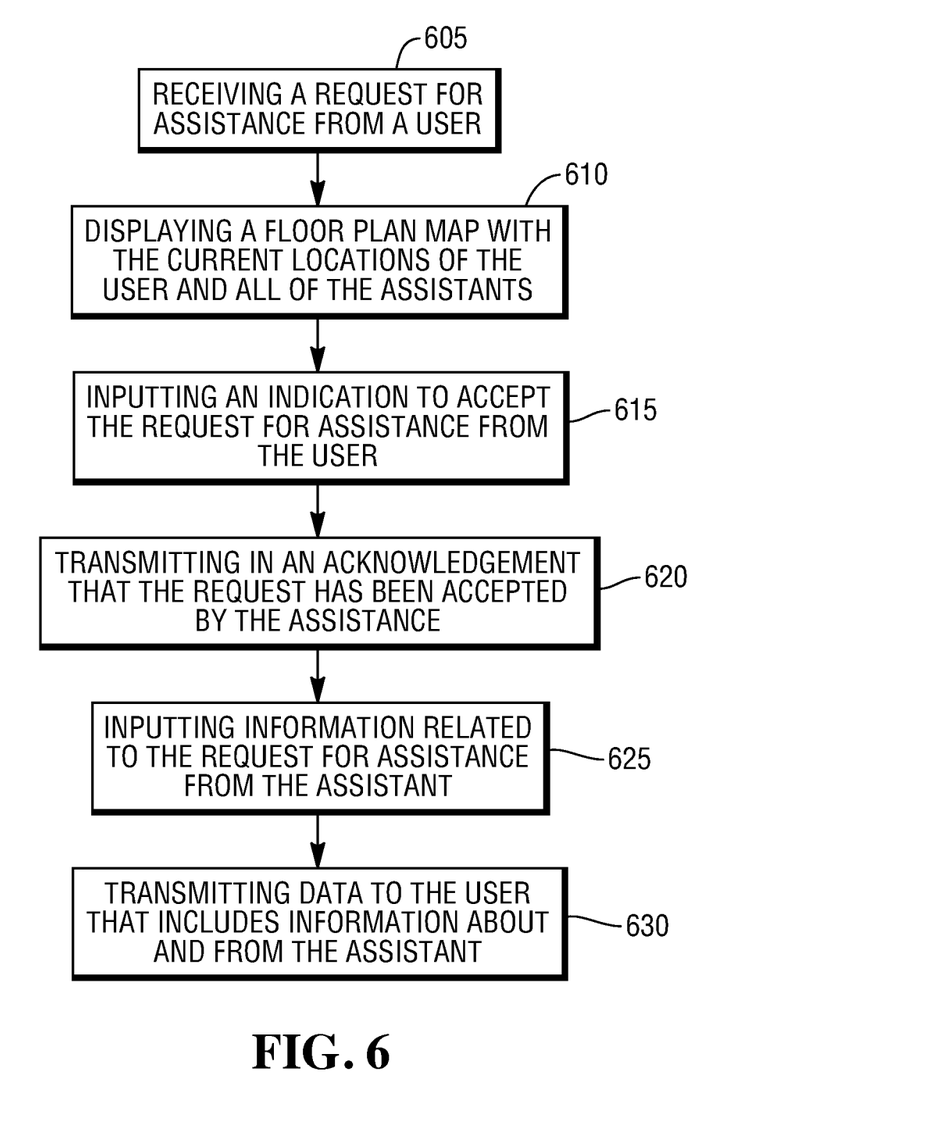
FIG. 6 a high-level flow diagram illustrating a method of operating an employee mobile smart device.

Turning to FIG. 6, there is provided a flow diagram illustrating an example method of operating the employee mobile smart device 201. Prior to the start of this example, an assistant has executed the employee customer assistance application 217 on their employee mobile smart device 201. The employee customer assistance application 217 requires the assistant to login which identifies the assistant and their location. The employee customer assistance application 217 transmits the information to the store server computer 15 which maintains a list of available assistants. An available assistant is an assistant that is working and available to service a request for assistance from a user. The employee customer assistance application 217 periodically transmits the location of the assistant to the store server computer 15. The store server computer 15 also maintains a list of requests for assistance from users. The list includes information on all open and closed requests for assistance including how long a request has been open and how long it took to service and close a request. This information can be sent to and displayed by the employee customer assistance application 217 if the roll of the employee allows them to see the information. Store managers are an example of one roll that is allowed to see the information. In addition, employees can be evaluated based on how many customer they assist per hour, or per shift and if those efforts lead to subsequent sales where the customer is tracked by an identifier provided when the application 216 was registered and by an identifier provided at checkout.

In this example, an assistant using the employee mobile smart device 201 executing the employee customer assistance application 217 receives a request for assistance from a user. The assistant and the user are located within an establishment. In this embodiment, the establishment is the retail store 300 and the user is a customer shopping within the retail store 300. In other embodiments, the user is a patron and the establishment is a library or an art gallery where the patron is visiting.

In step 605, the employee customer assistance application 217 receives a request for assistance from a user. The request includes data that identifies the type of assistance the user has requested. Some possible examples of the different types of requests are depicted in FIG. 4. If the type of assistance requires an assistant to travel to the user, the request includes the current location of the user. If the type of assistance includes a question, the question is included in the received data. The request for assistance from the user is sent to the store server computer 15 and after processing, the store server computer 15 transmits the request for assistance to all available employees or one or more particular employees using the employee mobile smart device 201 of each employee.

In step 610, the employee customer assistance application 217 displays a floor plan map of the establishment with the locations of the user and the available assistants represented on the map. Showing all the available assistants on the map allows the assistant closest to the user to service the request. Alternatively, the system can select the closest assistant who can accept the request if available. If the assistant indicates that they are busy, the system will select the next closest assistant and so on until an assistant is found to service the request.

In step 615, the assistant decides to service the request for assistance and touches an area of the display 230 to indicate acceptance. The employee customer assistance application 217 inputs an indication that the assistant wants to accept responsibility for the request for assistance from the user.

In step 620, the employee customer assistance application 217 transmits an acknowledgement that responsibility for the request for assistance has been accepted by the assistant. The acknowledgement is transmitted to the store server computer 15 which transmits the acknowledgement to all the other employee mobile smart devices 201 so the employee customer assistance applications 217 executing on them can indicate that the request has been accepted by another assistant. This prevents more than one assistant trying to service the request.

In step 625, the employee customer assistance application 217 inputs data from the assistant related to the request for assistance. If the request included a question, the inputted data will be an answer to the question. If the request requires the assistant to travel to the user, the inputted data may suitably include additional time that will be added to the calculated time required to travel to the user.

In step 630, the employee customer assistance application 217 transmits data back to the user that made the request for assistance. If the request requires the assistant to travel to the user, the data will include an arrival time for the assistant, the identity of the assistant and a floor plan map showing the location of the user and the employee. If the request included a question, the data will suitably include an answer to the question.

Although the present invention has been described with particular reference to certain preferred embodiments thereof, variations and modifications of the present invention can be effected within the spirit and scope of the following claims.

What is claimed is:

1. A method implemented by a mobile smart device and server for a user in an establishment to request assistance from assistants operating the establishment, the method comprising:
   inputting, on the mobile smart device, a request for assistance from the user within the establishment;
   determining, by the mobile smart device, a current location for the mobile smart device within the establishment, wherein the mobile smart device operated by the user;
   transmitting, by a customer assistance application executing on the mobile smart device, a request including information about the request for assistance and the current location to the server;
   determining, by the server, current locations of assistant devices associated with available assistants located within the establishment based on the current location of the mobile smart device and the request;
   identifying, by the server, a closest available assistant with training in an area associated with the information of request from the available assistants;
   assigning, by the server, the closest available assistant to handle the request;
   sending, by the server, data with an answer to the mobile smart device;
   receiving, by the customer assistance application, in response to the transmitted request, the data that includes the answer to the request for assistance;
   displaying, by the customer assistance application executing on the mobile smart device, the received data to the user of the mobile smart device and wherein displaying the received data further includes generating a screen on a display of the mobile smart device, and populating the generated screen with a floor plan map of the establishment depicting: 1) specific information identifying aisles within the establishment, 2) labeled shelving within the aisles, 3) labeled sections for each labeled shelve, 4) the current location of the mobile smart device within the floor plan map, 5) the current locations of the available assistants within the floor plan map relative to the current location of the mobile smart device, and 6) a closest available assistant location for the closest available assistant within the floor plan map relative to the current location of the mobile smart device wherein generating further includes providing selectable options with the generated screen that when activated by the user, while operating the mobile smart device, instructs a selected assistant to travel to the current location of the mobile smart device.

2. The method of claim 1, wherein the answer to the request includes an expected arrival time for the closest available assistant and the floor plan map of the establishment depicting the current location of the user and the closest available assistant in transit to the user.

3. The method of claim 2 further comprising: periodically updating, by the customer assistance application, the displayed floor plan map with the current location of the user and the closest available assistant in transit to the user.

4. The method of claim 1, wherein the answer to the request includes the floor plan map of the establishment depicting the location of the user and the location of a requested item in the establishment.

5. The method of claim 4, wherein the answer further includes directions to the requested item from the user's current location.

6. The method of claim 1, wherein the answer to the request includes the floor plan map of the establishment depicting the current location of the user.

7. The method of claim 1, wherein the request included a text message from the user and the answer to the request includes a text message response from the closest available assistant.

8. The method of claim 1, where determining a current location includes using a GPS device to determine the location of the mobile smart device.

9. The method of claim 1, where determining a current location includes capturing an image of an optical code and decoding a current location encoded into the optical code.

10. The method of claim 1, where determining a current location includes transmitting a request for the current location over a local wireless network and receiving from the local wireless network the current location of the mobile smart device.

11. A method implemented by mobile smart device and a server for an assistant of an establishment to respond to a request for assistance from a user while at the establishment, the method comprising:
   receiving, by the server, a request for assistance from the user within the establishment;
   determining, by the server, a current location for the mobile smart device operated by the user and current locations of active devices operated by active assistants available to handle the request on behalf of the user;
   identifying, by the server, a closest available assistant with training in an area associated with the request from the active assistants;
   assigning, by the server, the closest available assistant to handle the request;
   providing, by the server to the mobile smart device and the active devices, data based on the current location of the mobile smart device and the current locations of the active devices;
   displaying, by a customer assistance application executing on the mobile smart device, a generated screen on a display of the mobile smart device based on the data and populating the generated screen with a floor plan map of the establishing that identifies: 1) aisles within the establishment, 2) labeled sections for each labeled shelve, 3) a current location of the mobile smart device operated by the user within the floor plan map, 4) the current locations of the active assistants within the floor plan map relative to the current location of the mobile smart device, 5) and information identifying the request, wherein displaying further includes providing with the generated screen selectable options;

receiving, by the server, a selected option from the user that identifies a particular active assistant from the active assistants;

instructing, by the server, a particular assistant to travel to the current location of the user responsive to the selected option provided by the user;

obtaining, by the server, an indication from the particular assistant to the accept the user's request for assistance;

transmitting, by the server and in response to the inputting the indication, an acknowledgement that the request for assistance has been accepted by the particular assistant;

obtaining, by the server, other information related to the request of assistance from the particular assistant; and transmitting, by the server, data to the user that includes additional information identifying the particular assistant and the input data from the particular assistant.

12. The method of claim 11 further comprising: calculating, by the mobile smart device, the distance and time for the particular assistant to travel to the location of the user and wherein the transmitted response includes location information identifying the current location of the particular assistant and the time the particular assistant will arrive at the current location of the user.

13. The method of claim 12 further comprising: receiving, by the mobile smart device and from the server, additional time to be added to the calculated time for the particular assistant to travel to the location of the user.

14. The method of claim 13 further comprising: displaying, by the mobile smart device, the time remaining for the particular assistant to travel to the user's location.

15. The method of claim 11, wherein the received request form the user includes a text message from the user and the input from the assistant includes a text message response back to the user.

16. The method of claim 11, wherein displaying the floor plan map of the establishment includes displaying the current location of all of the assistants of the establishment.

17. The method of claim 11, further including receiving an acknowledgement that a request for assistance has been accepted by a different assistant and updating the floor plan map to show the request has been accepted and the different assistant that accepted the request.

18. The method of claim 11, wherein the establishment is a retail store.

* * * * *